(12) United States Patent
Garza et al.

(10) Patent No.: US 9,280,371 B2
(45) Date of Patent: Mar. 8, 2016

(54) UTILIZING CLIENT RESOURCES DURING MOBILITY OPERATIONS

(71) Applicant: International Business Machines Corporation, Armonk, NY (US)

(72) Inventors: Maria D. Garza, Round Rock, TX (US); Neal R. Marion, Georgetown, TX (US); James A. Pafumi, Leander, TX (US); Morgan J. Rosas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 13/938,856

(22) Filed: Jul. 10, 2013

(65) Prior Publication Data

US 2015/0020064 A1 Jan. 15, 2015

(51) Int. Cl.
G06F 9/50 (2006.01)
G06F 9/455 (2006.01)
G06F 9/48 (2006.01)

(52) U.S. Cl.
CPC .......... *G06F 9/45533* (2013.01); *G06F 9/4856* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,756,888 B2 | 7/2010 | Johnson et al. | |
| 7,882,326 B2 | 2/2011 | Armstrong et al. | |
| 7,984,262 B2 | 7/2011 | Battista et al. | |
| 8,171,236 B2 | 5/2012 | Jacobs et al. | |
| 2004/0190537 A1 | 9/2004 | Ferguson et al. | |
| 2005/0080874 A1 | 4/2005 | Fujiwara et al. | |
| 2005/0097384 A1 | 5/2005 | Uehara et al. | |
| 2006/0206891 A1* | 9/2006 | Armstrong et al. | 718/1 |
| 2007/0079176 A1 | 4/2007 | Armstrong et al. | |
| 2008/0222700 A1 | 9/2008 | Goldberg et al. | |
| 2008/0256501 A1 | 10/2008 | Armstrong et al. | |
| 2008/0256530 A1 | 10/2008 | Armstrong et al. | |
| 2009/0055830 A1 | 2/2009 | Gusler et al. | |
| 2009/0083575 A1 | 3/2009 | Armstrong et al. | |
| 2009/0182970 A1 | 7/2009 | Battista et al. | |
| 2009/0217283 A1* | 8/2009 | Anand et al. | 718/104 |
| 2009/0282300 A1 | 11/2009 | Heyrman et al. | |

(Continued)

OTHER PUBLICATIONS

PCT Notification of Transmittal of the International Search Report and the Written Opinion of the International Searching Authority, or the Declaration (PCT/ISA/220), the International Search Report (PCT/ISA/210) and the Written Opinion of the International Searching Authority (PCT/ISA/237), International Application No. PCT/JP2014/003293 dated Sep. 22, 2014, 7 pages.

(Continued)

*Primary Examiner* — Qing Wu
(74) *Attorney, Agent, or Firm* — Stephen R. Tkacs; Stephen J. Walder, Jr.; Thomas E. Tyson

(57) ABSTRACT

A mechanism is provided n a data processing system for logical partition migration. Responsive to a virtual machine monitor initiating a logical partition migration operation to move a logical partition from a source system to a destination system, the mechanism reallocates a portion of processing resources from the logical partition to the virtual machine monitor. The virtual machine monitor uses the portion of processing resources to effect the logical partition migration operation. Responsive to completion of the logical partition migration operation, the mechanism returns the portion of processing resources to the logical partition.

16 Claims, 3 Drawing Sheets

(56) References Cited

U.S. PATENT DOCUMENTS

| | | | |
|---|---|---|---|
| 2009/0307447 A1 | 12/2009 | Jacobs et al. | |
| 2009/0307538 A1 | 12/2009 | Hernandez et al. | |
| 2009/0307688 A1 | 12/2009 | Pafumi et al. | |
| 2009/0313401 A1 | 12/2009 | Mani et al. | |
| 2010/0122124 A1 | 5/2010 | Chen et al. | |
| 2010/0122249 A1 | 5/2010 | Anderson et al. | |
| 2010/0161559 A1 | 6/2010 | Patil et al. | |
| 2010/0183009 A1 | 7/2010 | Baratakke et al. | |
| 2010/0229181 A1 | 9/2010 | Ahuja et al. | |
| 2011/0125979 A1 | 5/2011 | Kancharla et al. | |
| 2012/0066389 A1 | 3/2012 | Hegde et al. | |
| 2012/0198202 A1 | 8/2012 | Arndt et al. | |
| 2012/0303594 A1 | 11/2012 | Mcwhinney et al. | |
| 2013/0024718 A1 | 1/2013 | Mewhinney et al. | |
| 2013/0031341 A1 | 1/2013 | Ganti et al. | |
| 2014/0372723 A1 | 12/2014 | Bobroff et al. | |
| 2015/0040128 A1 | 2/2015 | Garza et al. | |
| 2015/0046589 A1 | 2/2015 | Garza et al. | |

OTHER PUBLICATIONS

U.S. Appl. No. 13/959,134.
U.S. Appl. No. 13/959,822.
"IBM PowerVM Virtualization Introduction and Configuration", IBM Corporation, ibm.com/redbooks, Nov. 2012, 822 pages.
"Power Systems Logical Partitioning", IBM Corporation, http://pic.dhe.ibm.com/infocenter/powersys/v3r1m5/topic/iphat/iphat.pdf, 246 pages, 2007.
"Veritas Storage Foundation and High Availability Solutions Virtualization Guide", Symantec Corporation, Feb. 2012, 110 pages.
Armstrong, W.J. et al., "IBM POWER6 Partition Mobility: Moving Virtual Servers Seamlessly Between Physical Systems", IBM Journal of Research and Development, vol. 51, No. 6, pp. 757-762, Nov. 2007.
Attanasio, C.R., "Virtual Control Storage—security measures in VM/370", IBM Syst J, vol. 18 No. 1, 1979, pp. 93-110.
Bailey, John E. et al., "IBM PowerVM Live Partition Mobility", http://www.redbooks.ibm.com/redbooks/pdfs/sg247460.pdf, Mar. 2009, 312 pages.
Bamiah, Mervat A. et al., "Using Virtual Machine Monitors to Overcome the Challenges of Monitoring and Managing Virtualized Cloud Infrastructures", Proceedings of the SPIE—The International Society for Optical Engineering, vol. 8349, 2011, 5 pages.
Brito, Allyson et al., "IBM PowerVM Virtualization Active Memory Sharing", IBM Corporation, ibm.com/redbooks, Jun. 2011; 122 pages.
Clark, Christopher et al., "Live Migration of Virtual Machines", USENIX Association NSDI '05: 2nd Symposium on Networked Systems Design & Implementation, May 2-4, 2005, pp. 273-286.
Elmore, Aaron J. et al., "Zephyr: Live Migration in Shared Nothing Databases for Elastic Cloud Platforms", SIGMOD '11, Jun. 12-16, 2011, Athens, Greece, 12 pages.
Liu, Haikun et al., "Live Migration of Virtual Machine Based on Full System Trace and Replay", HPDC '09, Jun. 11-13, 2009, Munich, Germany, 10 pages.
Murphy, Richard C., "Design Parameters for Distributed PIM Memory Systems", Department of Computer Science and Engineering, Notre Dame, Indiana, Apr. 2000, 220 pages.
U.S. Appl. No. 14/039,172.
U.S. Appl. No. 14/039,436.
"IBM Power Systems Live Partition Mobility", IBM Corporation 2007, 2009, 128 pages.

* cited by examiner

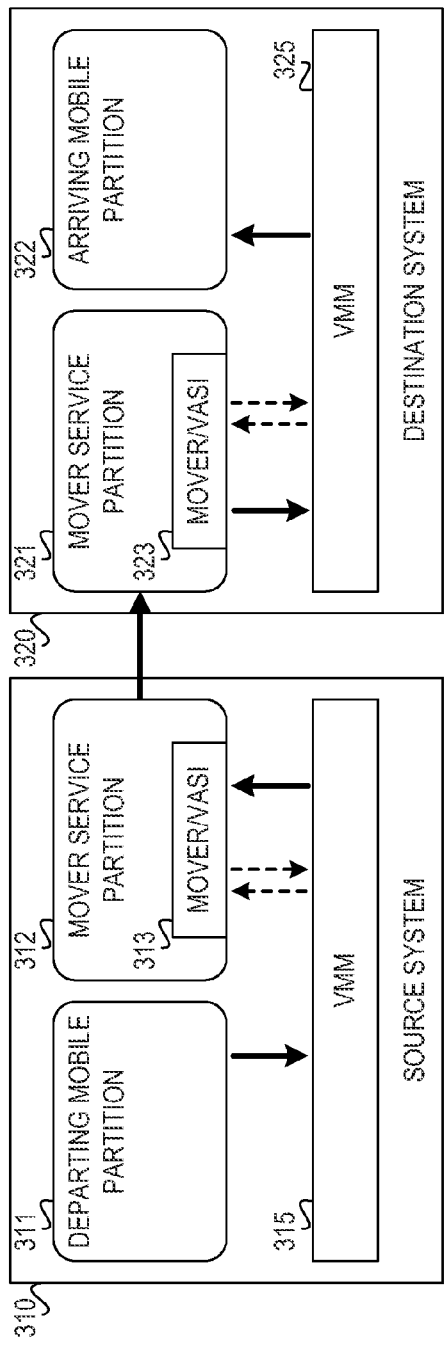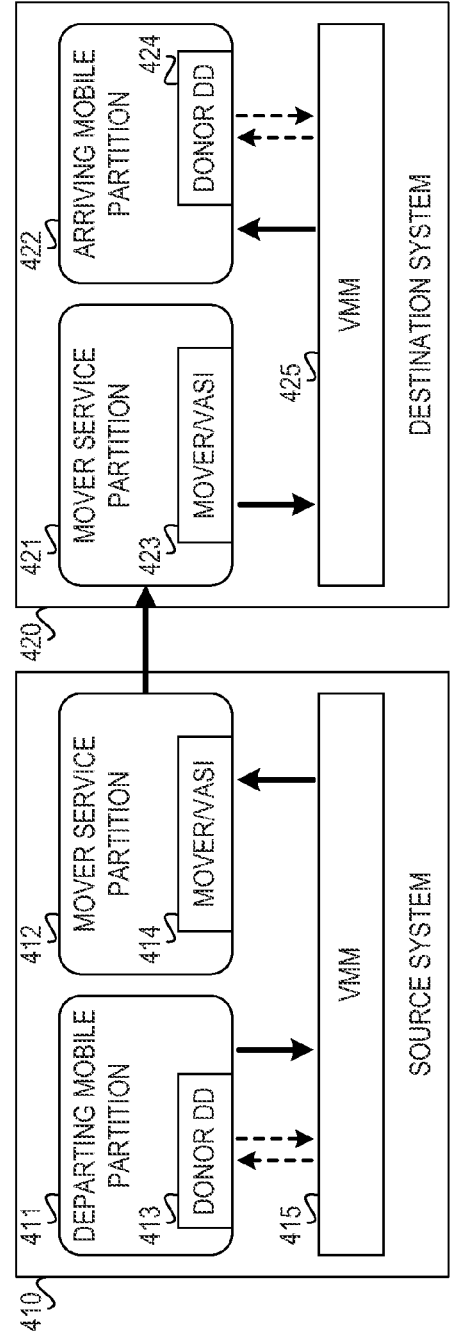

UTILIZING CLIENT RESOURCES DURING MOBILITY OPERATIONS

BACKGROUND

The present application relates generally to an improved data processing apparatus and method and more specifically to mechanisms for utilizing client resources during mobility operations to enhance performance and better utilize system resources.

Live Partition Mobility (LPM) is a feature of POWER6® and POWER7® servers that allows a running logical partition (LPAR) to be relocated from one system to another. POWER6 and POWER7 are trademarks of International Business Machines Corporation in the United States and other countries. The source and target systems must have access to the same network and storage area networks (SANs) but need not be of the same type. Partitions that are to be relocated must be fully virtualized (i.e., have no dedicated input/output (I/O) adapters) although it is possible to use multi-pathing software to fail over to virtual adapters for the duration of the move.

Any sized partition can be moved; essentially, memory is copied asynchronously from one system to another to create a clone of a running partition, with "dirty" pages being re-copied as necessary. When a threshold is reached (i.e., when a high percentage of the pages have been successfully copied across), the partition is transitioned to the target machine and any remaining pages are copied across synchronously. The agents that carry out the memory copying are nominated Virtual I/O Servers (VIOS) on each machine. LPM is used to avoid outages for planned server maintenance, for load balancing across multiple servers and for energy conservation.

SUMMARY

In one illustrative embodiment, a method, in a data processing system, is provided comprising responsive to a virtual machine monitor initiating a logical partition migration operation to move a logical partition from a source system to a destination system, reallocating a portion of processing resources from the logical partition to the virtual machine monitor. The method further comprises performing, by the virtual machine monitor, the logical partition migration operation. The virtual machine monitor uses the portion of processing resources to effect the logical partition migration operation. The method further comprises responsive to completion of the logical partition migration operation, returning the processing resources to the logical partition.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a block diagram illustrating partition migration with processor resource donation in accordance with an embodiment;

FIG. 4 is a block diagram illustrating partition migration with processor resource donation by the migrating partition in accordance with an illustrative embodiment;

DETAILED DESCRIPTION

Figure 1:
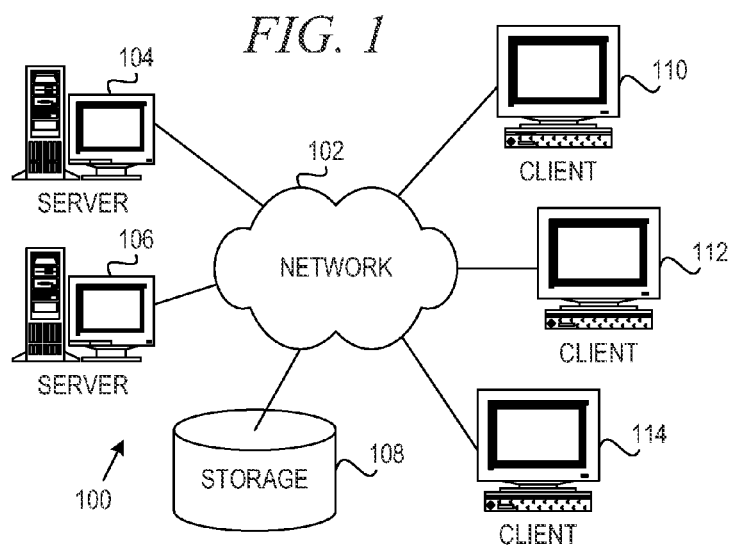
FIG. 1 depicts a pictorial representation of an example distributed data processing system in which aspects of the illustrative embodiments may be implemented.

The illustrative embodiments provide a mechanism to utilize client resources during mobility operations to enhance performance and better utilize system resources. Live Partition Mobility (LPM) provides the ability to move a running partition with its operating system (OS) and applications from one physical server (i.e., a computer electronic complex (CEC)) to another without disrupting the operation of that partition. A Virtual Asynchronous Services Interface (VASI) virtual device and mover kernel extension on a Virtual I/O Server (VIOS) partition provides the function or transporting the partition state from one system to another. A VIOS configured to utilize this functionality is considered a mover service partition (MSP).

The POWER® Hypervisor (PHYP) is a thin firmware level that has knowledge of the client partition's state, including the client partition's memory. A hypervisor is a type of virtual machine monitor of a data processing system that creates, runs, and manages virtual machines (logical partitions). A hypervisor or VMM also performs virtualization of resources allocated to logical partitions and performs other functions for running and managing logical partitions. White the example embodiments described herein refer to a PHYP, or more generally to a hypervisor, the aspects of the invention apply to any form of virtualization component or VMM.

During an active migration, PHYP provides support to transfer the client information, both state and memory image, between the MSPs of source and destination systems. To move the client's memory image, PHYP sends and tracks the client's memory and can potentially resend dirty pages as the client continues to run during nearly of the mobility operation.

In one implementation, PHYP does not have any memory or central processing unit (CPU) entitlement of its own and it relies on both the source and destination MSPs to provide the resources it needs to move the client's data in a secure manner from one physical system to another during an LPM operation.

The client's memory image can be quite large, especially in clients running databases. In addition, with the current rate of adoption of the LPM functionality, there is a continued push to move towards supporting a higher number of concurrent mobility operations. The amount of VIOS CPU cycles utilized by PHYP increases if the MSP needs to support the mobility of large clients or a high number of multiple concurrent mobility operations.

A user of LPM must allocate additional resources on a VIOS partition to support MSP functionality or impact the performance of mobility and other operations on the VIOS. In addition, although partition mobility is considered a must in any data center to avoid outages, LPM is not likely running at all times. This means that current solutions VIOS needs to be sized for the peak toads, thus underutilizing resources, or the operator must take the extra step of giving resources to the VIOS to support the peak loads prior to running an LPM operation.

The illustrative embodiments provide mechanisms for the PHYP to utilize CPU resources from the client partitions being moved, thus freeing up CPU resources on the MSP. The mechanisms reduce the amount of VIOS resources necessary for live partition mobility operations. The mechanisms of the illustrative embodiments allow for increased overall system utilization and possible cost savings.

The mechanisms of the illustrative embodiments allow a VIOS partition to be configured with less CPU resources and still continue to support many parallel mobility operations, including those of large clients. The mechanisms reduce the impact that mobility operations have on non-migrating clients being serviced by the VIOS. Key client partitions already favored by the operator with additional CPU resources are likely to complete the mobility operation faster when migrated in parallel with other less favored client partitions. The mechanisms also reduce CPU overhead associated with the VIOS giving cycles to PHYP, increasing overall system efficiency. The mechanisms of the illustrative embodiments also increase overall performance of mobility operations because the migrating client has access to less CPU resources, thus reducing the client's opportunity to change memory pages that have already been sent to the destination system resulting in reduce numbers of pages that must be resent.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As wilt be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
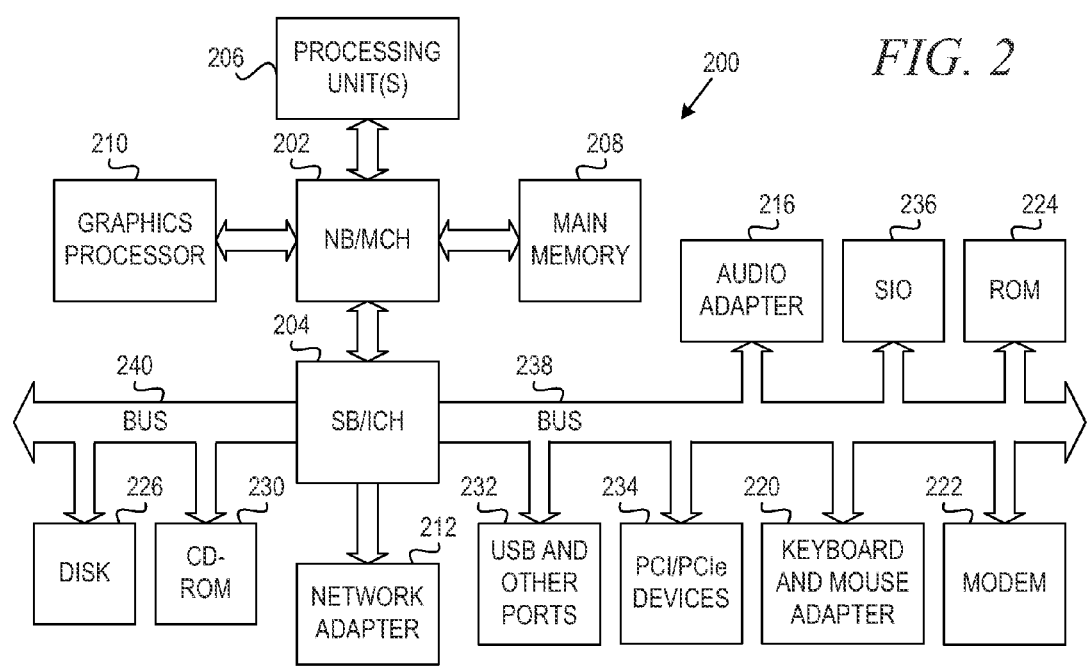
FIG. 2 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204, An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIG. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is a block diagram illustrating partition migration with processor resource donation in accordance with an embodiment. Departing mobile partition 311 is being migrated from source system 310 to destination system 320. In the partition migration operation, virtual machine monitor (VMM) 315 provides support to transfer state and memory image of departing mobile partition 311 from mover service partition (MSP) 312 in source system 310 to MSP 321 in destination system 320. VMM 325 provides support to receive state and memory image of arriving mobile partition 322 using MSP 321 in destination system 320.

MSP 312 includes a mover/VASI device driver 313, and MSP 321 includes mover/VASI device driver 323. Mover/VASI device driver 313 provides central processing unit (CPU) cycles to VMM 315, and mover/VASI device driver 323 provides CPU cycles to VMM 325 to perform the partition migration operation. VMM 315 sends and tracks the client partition's memory and can potentially resend dirty pages as the client partition continues to run during nearly all of the mobility operation.

The client's memory image can be quite large, especially in clients running databases. In addition, with the current rate of adoption of the LPM functionality, there is a continued push to move towards supporting a higher number of concurrent mobility operations. The amount of CPU cycles utilized by the VMM increases if the MSP 312, 321 need to support the mobility of large clients or a high number of multiple concurrent mobility operations.

A user of LPM must allocate additional resources on MSPs 312, 321 to support MSP functionality or impact the performance of mobility and other operations on the MSP 312, 321. In addition, although partition mobility is considered a must in any data center to avoid outages, LPM is not likely running at all times. This means that current solutions MSP 312, 321 needs to be sized for the peak loads, thus underutilizing resources, or the operator must take the extra step of giving resources to MSP 312, 321 to support the peak loads prior to running an LPM operation.

FIG. 4 is a block diagram illustrating partition migration with processor resource donation by the migrating partition in accordance with an illustrative embodiment. Departing mobile partition 411 is being migrated from source system 410 to destination system 420. In the partition migration operation, VMM 415 provides support to transfer state and memory image of departing mobile partition 411 from mover service partition (MSP) 412 in source system 410 to MSP 421 in destination system 420. VMM 425 provides support to receive state and memory image of arriving mobile partition 422 using MSP 421 in destination system 420.

In accordance with the illustrative embodiment, departing mobile partition 411 includes a donor device driver 413, which provides CPU cycles to VMM 415. The mover/VASI device driver 414 no longer provides CPU cycles but retains all other responsibilities. In an alternative embodiment, donor device driver 413 may donate most of the needed CPU cycles, while mover/VASI device driver 414 donates only a small portion of the CPU cycles needed for the partition migration operation.

At destination system 420, arriving mobile partition 422 includes donor device driver 424, which provides CPU cycles to hypervisor 425 to effect the partition migration operation. In one example embodiment, mover/VASI device driver 423 may donate a small portion of CPU cycles to VMM 425.

Figure 5:
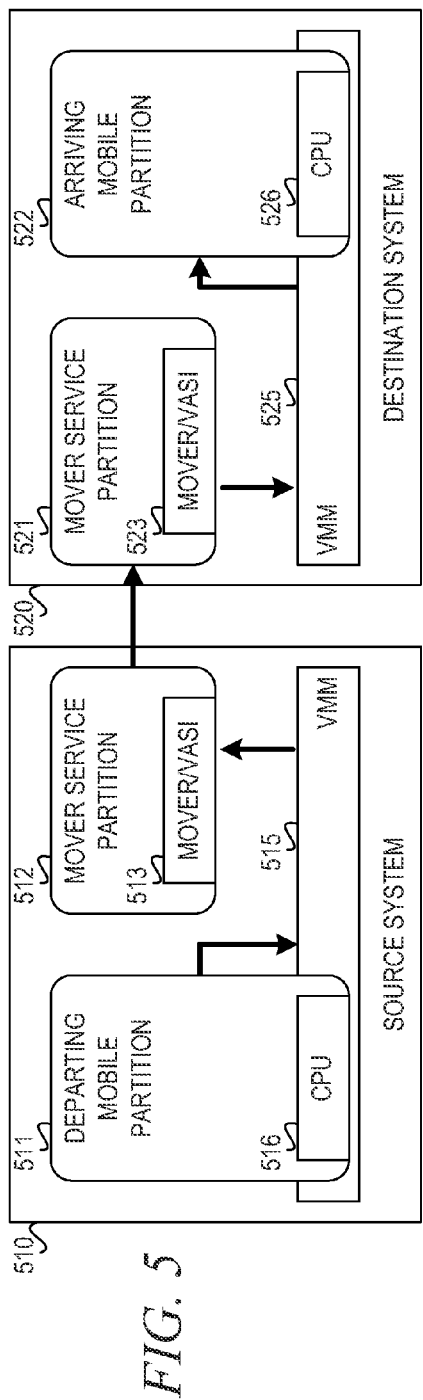
FIG. 5 is a block diagram illustrating partition migration with virtual machine monitor control over processor resources in accordance with an illustrative embodiment.

FIG. 5 is a block diagram illustrating partition migration with virtual machine monitor control over processor resources in accordance with an illustrative embodiment. Departing mobile partition 511 is being migrated from source system 510 to destination system 520. In the partition migration operation, VMM 515 provides support to transfer state and memory image of departing mobile partition 511 from mover service partition (MSP) 512 in source system 510 to MSP 521 in destination system 520. VMM 525 provides support to receive state and memory image of arriving mobile partition 522 using MSP 521 in destination system 520.

In accordance with the illustrative embodiment, VMM 515 has control over resources allocated to partitions. Instead of having MSP 512 donate CPU cycles via mover/VASI driver 513, VMM 515 utilizes some resources assigned to departing mobile partition 511. VMM 515 may automatically reduce an amount of CPU resources 516 from the migrating client 511 to be specifically utilized by VMM 515 for the mobility operation. Similarly, as MSP 521 receives arriving mobile partition 522, VMM 525 utilizes an amount of CPU resources 526 assigned to arriving mobile partition 522 for the mobility operation. The management of virtual resources is already transparent to each partition; therefore, the VMM 515, 525 utilizing CPU resources 516, 526 assigned to the migrating partition 511, 522 would have little or no impact on performance of the partition 511, 521. The mover kernel extension 513, 523 will no longer provide CPU cycles to VMM 515, 525, but retains all other responsibilities. Alternatively, mover/VASI device driver 513, 523 may donate a small amount of CPU resources in addition to the CPU resources assigned to the mobile partition 511, 522.

Figure 6:
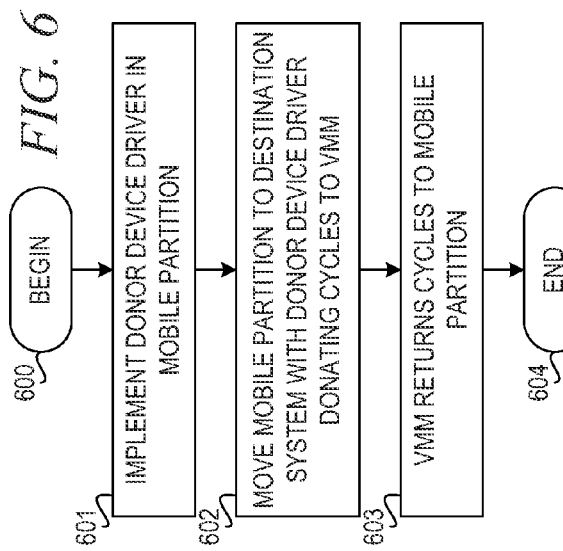
FIG. 6 is a flowchart illustrating a partition migration operation with processor resource donation by the migrating partition in accordance with an illustrative embodiment.

FIG. 6 is a flowchart illustrating a partition migration operation with processor resource donation by the migrating partition in accordance with an illustrative embodiment. Operation begins (block 600), and the virtual machine monitor (VMM) implements a donor device driver in the mobile partition (block 601). The mobile partition may be a departing mobile partition or an arriving mobile partition. On the source system, the VMM implements the donor device driver in the departing mobile partition, and the donor device driver donates CPU cycles to the hypervisor in response to the VMM initiating a migration operation involving the departing the mobile partition. On the destination system, the VMM initializes a logical partition for the arriving mobile partition including the donor device driver, which donates CPU cycles to the VMM until the migration operation is complete.

The VMM then moves the mobile partition with the help of the mover service partition to the destination system with the donor device driver donating cycles to the VMM to effect the migration (block 602). On the source system, the VMM moves the mobile partition by copying the partition's state, including the partition's memory image, to the destination system via the mover service partition. On the destination system, the VMM receives the partition's state, including the partition's memory image, via the mover service partition.

When the migration operation is complete, the VMM returns the CPU cycles to the mobile partition (block 603). In the case of the source system, the departing mobile partition is ended, and in the case of the destination system, the arriving mobile partition is placed in a live state. Thereafter, operation ends (block 604).

Figure 7:
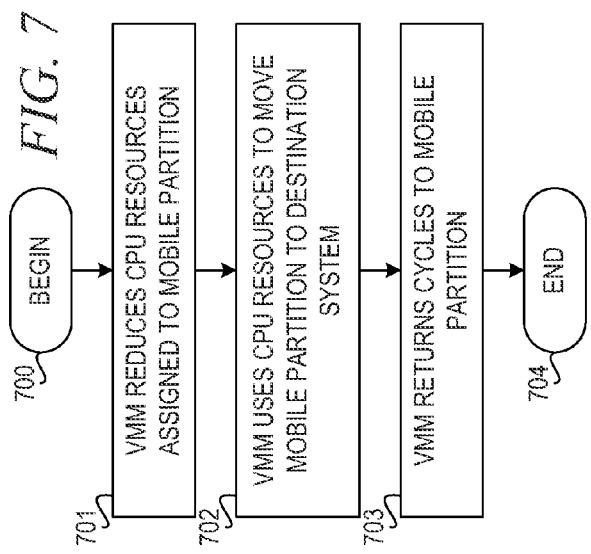
FIG. 7 is a flowchart illustrating a partition migration operation with virtual machine monitor control over processor resources in accordance with an illustrative embodiment.

FIG. 7 is a flowchart illustrating a partition migration operation with virtual machine monitor control over processor resources in accordance with an illustrative embodiment. Operation begins (block 700), and the VMM reduces CPU resources assigned to the mobile partition (block 701). The mobile partition may be a departing mobile partition or an arriving mobile partition. On the source system, the VMM controls allocation of CPU resources to the mobile partition to reduce CPU resources in response to the VMM initiating a migration operation involving the departing the mobile partition. The VMM may then use that amount of CPU resources for the migration operation. On the destination system, the VMM reduces the CPU resources allocated to the arriving mobile partition and uses that amount of CPU resources for the migration operation.

The VMM then moves the mobile partition with the help of the mover service partition to the destination system using the amount of CPU resources taken from the mobile partition itself (block 702). In an alternative embodiment, the mover/VASI driver of the mobile service partition may donate additional CPU resources to the VMM. On the source system, the VMM moves the mobile partition by copying the partition's state, including the partition's memory image, to the destination system via the mover service partition. On the destination system, the VMM receives the partition's state, including the partition's memory image, via the mover service partition.

When the migration operation is complete, the VMM returns the CPU resources to the mobile partition (block 703). In the case of the source system, the departing mobile partition is ended, and in the case of the destination system, the arriving mobile partition is placed in a live state. Thereafter, operation ends (block 704).

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:

responsive to a virtual machine monitor initiating a logical partition migration operation to move a logical partition from a source system to a destination system, reallocate a portion of processing resources from the logical partition to the virtual machine monitor;

perform, by the virtual machine monitor, the logical partition migration operation, wherein the virtual machine monitor uses the portion of processing resources to effect the logical partition migration operation; and responsive to completion of the logical partition migration operation, return the portion of processing resources to the logical partition.

2. The computer program product of claim 1, wherein the logical partition comprises a donor device driver, wherein the donor device driver donates the portion of processing resources to the virtual machine monitor.

3. The computer program product of claim 1, wherein the virtual machine monitor reallocates the portion of processing resources from the logical partition to be used for the logical partition migration operation.

4. The computer program product of claim 1, wherein the virtual machine monitor executes in the source system, wherein perfuming the logical partition migration operation comprises copying, by the virtual machine monitor, a state of the logical partition to the destination system via a mover service partition executing in the source system.

5. The computer program product of claim 4 wherein the mover service partition comprises a virtual asynchronous services interface virtual device and mover kernel extension and wherein the virtual asynchronous services interface virtual device and mover kernel extension perform: logical partition migration functions other than donating processing resources.

6. The computer program product of claim 1, wherein the virtual machine monitor executes in the destination system, wherein performing the logical partition migration operation comprises receiving, by the virtual machine monitor, a state of the logical partition from the source system via a mover service partition executing in the destination system.

7. The computer program product of claim 6, wherein the mover service partition comprises a virtual asynchronous services interface virtual device and mover kernel extension and wherein the virtual asynchronous services interface virtual device and mover kernel extension perform logical partition migration functions other than donating processing resources.

8. The computer program product of claim 1, wherein the computer readable program is stored in a computer readable storage medium in a data processing system and wherein the computer readable program was downloaded over a network from a remote data processing system.

9. The computer program product of claim 1, wherein the computer readable program is stored in a computer readable storage medium in a server data processing system and wherein the computer readable program is downloaded over a network to a remote data processing system for use in a computer readable storage medium with the remote system.

10. An apparatus comprising:
a processor; and
a memory coupled to the processor, wherein the memory comprises instructions which, when executed by the processor, cause the processor to:

responsive to a virtual machine monitor initiating a logical partition migration operation to move a logical partition from a source system to a destination system, reallocating a portion of processing resources from the logical partition to the virtual machine monitor;

performing, by the virtual machine monitor, the logical partition migration operation, wherein the virtual machine monitor uses the portion of processing resources to effect the logical partition migration operation; and responsive to completion of the logical partition migration operation, returning the portion of processing resources to the logical partition.

11. The apparatus of claim 10, wherein the logical partition comprises a donor device driver, wherein the donor device driver donates the portion of processing resources to the virtual machine monitor.

12. The apparatus of claim 10, wherein the virtual machine monitor executes in the source system, wherein performing the logical partition migration operation comprises copying, by the virtual machine monitor, a state of the logical partition to the destination system via a mover service partition executing in the source system.

13. The apparatus of claim 12, wherein the mover service partition comprises a virtual asynchronous services interface virtual device and mover kernel extension and wherein the virtual asynchronous services interface virtual device and mover kernel extension perform logical partition migration functions other than donating processing resources.

14. The apparatus of claim 10, wherein the virtual machine monitor executes in the destination system, wherein performing the logical partition migration operation comprises receiving, by the virtual machine monitor, a state of the logical partition from the source system via a mover service partition executing in the destination system.

15. The apparatus of claim 14, wherein the mover service partition comprises a virtual asynchronous services interface virtual device and mover kernel extension and wherein the virtual asynchronous services interface virtual device and mover kernel extension perform logical partition migration functions other than donating processing resources.

16. The apparatus of claim 10, wherein the virtual machine monitor reallocates the portion of processing resources from the logical partition to be used for the logical partition migration operation.

* * * * *